US009845232B2

(12) United States Patent
Campbell et al.

(10) Patent No.: US 9,845,232 B2
(45) Date of Patent: Dec. 19, 2017

(54) PUNCTURING DEVICE FOR AEROSOL CONTAINERS

(71) Applicant: Justrite Manufacturing Company, LLC, Des Plaines, IL (US)

(72) Inventors: Michael C. Campbell, Virginia Beach, VA (US); Erik J. Woodward, North Tonawanda, NY (US)

(73) Assignee: Justrite Manufacturing Company, LLC, Des Plaines, IL (US)

( * ) Notice: Subject to any disclaimer, the term of this patent is extended or adjusted under 35 U.S.C. 154(b) by 0 days.

(21) Appl. No.: 14/623,996

(22) Filed: Feb. 17, 2015

(65) Prior Publication Data
US 2015/0298955 A1 Oct. 22, 2015

Related U.S. Application Data

(60) Provisional application No. 61/940,810, filed on Feb. 17, 2014, provisional application No. 62/063,885, filed on Oct. 14, 2014.

(51) Int. Cl.
*B67C 9/00* (2006.01)
*B09B 3/00* (2006.01)
*B67B 7/00* (2006.01)

(52) U.S. Cl.
CPC .............. *B67C 9/00* (2013.01); *B09B 3/0058* (2013.01); *B67B 7/24* (2013.01)

(58) Field of Classification Search
CPC .............. B09B 3/00; B65B 31/04; B67B 7/00
(Continued)

(56) References Cited

U.S. PATENT DOCUMENTS

| 1,242,873 A | 10/1917 | Schroeder |
| 1,555,759 A | 9/1925 | Rowe |

(Continued)

FOREIGN PATENT DOCUMENTS

| CN | 105312302 A | 2/2016 |
| DE | 1607991 A1 | 10/1970 |

(Continued)

OTHER PUBLICATIONS

TalkTools "Adult Straw with Blue Lip Block," http://www.talktools.com/adult-straw-with-blue-lip-block/ 1 page (Oct. 7, 2016).

(Continued)

*Primary Examiner* — Timothy L Maust
*Assistant Examiner* — Andrew Schmid
(74) *Attorney, Agent, or Firm* — Leydig, Voit & Mayer, Ltd.

(57) ABSTRACT

A puncturing device for pressurized containers comprises an elongated housing member defining an elongated cavity with openings at first and second ends thereof for receiving an inverted pressurized container at the first end, the housing member including an attachment member for securing the second end of the housing member to a collection receptacle. A non-sparking puncturing member, is mounted within the housing member for piercing a nozzle-end of the pressurized container at its domed top. A counter records each action of the puncture pin. Gases and residual contents are released into the receptacle through the hollow core of the puncture pin. An auxiliary support member is mounted on the housing member for stabilizing relative movement between the housing member and the receptacle. A force-applying apparatus is mounted on the housing member for forcing the pressurized container onto the puncture pin.

20 Claims, 11 Drawing Sheets

(58) Field of Classification Search
USPC ............ 141/65, 69, 94, 329, 330; 100/288; 222/5; 414/412

See application file for complete search history.

(56) References Cited

U.S. PATENT DOCUMENTS

| | | | |
|---|---|---|---|
| 1,586,298 | A | 5/1926 | Eaton |
| 1,599,685 | A | 9/1926 | Spaeth |
| 1,718,985 | A | 7/1929 | Scoville |
| 2,014,187 | A | 9/1935 | Neff |
| 2,553,942 | A | 5/1951 | Roos |
| 2,569,319 | A | 9/1951 | Krug |
| 2,778,223 | A | 11/1953 | Kimbrell |
| 2,671,528 | A | 3/1954 | Gross |
| 2,851,768 | A | 9/1958 | Ellis |
| D185,589 | S | 6/1959 | Allen |
| 3,157,107 | A | 11/1964 | Kosar |
| 3,169,665 | A | 2/1965 | Colley |
| 3,303,968 | A | 2/1967 | Compere |
| 3,333,735 | A | 8/1967 | Odasso |
| 3,358,883 | A | 12/1967 | Loe |
| 3,430,819 | A | 3/1969 | Moonan |
| 3,438,548 | A | 4/1969 | Ceyba |
| 3,828,976 | A | 8/1974 | Sidelinker |
| 3,834,589 | A | 9/1974 | Morane et al. |
| 3,840,967 | A | 10/1974 | Olson |
| 3,891,417 | A | 6/1975 | Wade |
| 3,926,340 | A | 12/1975 | Tygenhof |
| 4,071,012 | A | 1/1978 | Cooke |
| 4,223,799 | A | 9/1980 | Eyster et al. |
| 4,252,547 | A | 2/1981 | Johnson |
| D266,188 | S | 9/1982 | Seeley et al. |
| 4,349,054 | A | 9/1982 | Chipman |
| 4,407,341 | A | 10/1983 | Feldt et al. |
| 4,420,012 | A | 12/1983 | Astrom |
| 4,426,863 | A | 1/1984 | Gillette et al. |
| 4,459,906 | A | 7/1984 | Cound et al. |
| 4,500,015 | A | 2/1985 | Penney |
| 4,580,700 | A | 4/1986 | Rush |
| 4,620,576 | A | 11/1986 | Owen, Jr. |
| 4,655,060 | A | 4/1987 | Jakubas |
| 4,699,190 | A | 10/1987 | Bates |
| 4,700,866 | A | 10/1987 | Taylor |
| 4,705,082 | A | 11/1987 | Fanshaw et al. |
| 4,742,688 | A | 5/1988 | Rubin |
| 4,782,597 | A | 11/1988 | Mills |
| 4,788,840 | A | 12/1988 | Wilson, Jr. |
| 4,811,977 | A | 3/1989 | Swift et al. |
| 4,834,267 | A | 5/1989 | Schroer et al. |
| 4,934,055 | A | 6/1990 | Chambers |
| 4,959,980 | A | 10/1990 | Phillips |
| 4,968,333 | A | 11/1990 | Ellis et al. |
| 5,002,593 | A | 3/1991 | Ichishita et al. |
| 5,067,529 | A | 11/1991 | Gonzalez-Miller et al. |
| 5,086,814 | A | 2/1992 | Sato et al. |
| 5,088,526 | A | 2/1992 | Nash |
| 5,114,043 | A | 5/1992 | Collins, Jr. |
| 5,125,700 | A | 6/1992 | Fattori et al. |
| 5,141,656 | A | 8/1992 | Rountree |
| 5,163,585 | A * | 11/1992 | Campbell ................ B67B 7/28 141/329 |
| 5,181,462 | A | 1/1993 | Isaac |
| 5,188,155 | A | 2/1993 | Kremer |
| 5,199,286 | A | 4/1993 | Jakubas |
| 5,265,762 | A * | 11/1993 | Campbell ................ B67B 7/28 141/329 |
| 5,271,437 | A | 12/1993 | O'Brien |
| 5,284,997 | A | 2/1994 | Spearman |
| 5,285,827 | A | 2/1994 | Gonzalez-Miller |
| 5,303,749 | A | 4/1994 | Stock et al. |
| 5,309,956 | A * | 5/1994 | Hajma ................ B09B 3/0058 100/104 |
| 5,322,093 | A | 6/1994 | O'Neil |
| 5,332,009 | A | 7/1994 | Van Etten |
| 5,337,503 | A | 8/1994 | Goby |
| 5,339,876 | A | 8/1994 | Mattern |
| 5,341,853 | A | 8/1994 | Nugues et al. |
| 5,351,859 | A | 10/1994 | Jansen |
| 5,365,982 | A | 11/1994 | O'Neill |
| 5,370,268 | A | 12/1994 | Adams |
| 5,383,498 | A | 1/1995 | Mattern et al. |
| 5,385,177 | A | 1/1995 | O'Neil |
| 5,421,380 | A * | 6/1995 | Campbell ................ B08B 9/08 137/327 |
| 5,427,157 | A | 6/1995 | Nickens et al. |
| 5,427,609 | A | 6/1995 | Zoglman et al. |
| 5,460,154 | A | 10/1995 | Mattern et al. |
| 5,465,473 | A | 11/1995 | Teeslink |
| 5,469,898 | A | 11/1995 | Campbell |
| 5,471,730 | A | 12/1995 | Sackett |
| 5,474,114 | A | 12/1995 | Nickens et al. |
| 5,499,665 | A | 3/1996 | Gold et al. |
| 5,499,945 | A | 3/1996 | Ferlin et al. |
| 5,524,945 | A | 6/1996 | Georgopoulos et al. |
| 5,529,097 | A * | 6/1996 | Campbell ............. B09B 3/0058 141/330 |
| 5,533,767 | A | 7/1996 | Georgopoulos et al. |
| 5,535,730 | A | 7/1996 | Mattern |
| 5,546,995 | A | 8/1996 | Van Etten |
| 5,564,414 | A | 10/1996 | Walker et al. |
| 5,568,951 | A | 10/1996 | Morgan |
| 5,584,325 | A | 12/1996 | Nickens et al. |
| 5,596,892 | A | 1/1997 | Edgar et al. |
| 5,613,533 | A | 3/1997 | Gold et al. |
| 5,613,534 | A | 3/1997 | Nickens et al. |
| 5,615,715 | A | 4/1997 | Yore |
| 5,657,800 | A | 8/1997 | Campbell |
| D383,659 | S | 9/1997 | Norman |
| 5,664,610 | A | 9/1997 | Nickens et al. |
| 5,702,592 | A | 12/1997 | Suri et al. |
| 5,715,803 | A | 2/1998 | Mattern |
| 5,727,498 | A | 3/1998 | Hackler et al. |
| 5,740,615 | A | 4/1998 | Treske |
| 5,743,246 | A | 4/1998 | Mattern |
| 5,775,362 | A | 7/1998 | Sato et al. |
| 5,785,038 | A | 7/1998 | Mattern |
| 5,819,815 | A | 10/1998 | Nickens et al. |
| 5,823,236 | A * | 10/1998 | Kirby ................ B67B 7/28 141/329 |
| 5,826,447 | A | 10/1998 | Campbell |
| 5,826,631 | A | 10/1998 | Gold et al. |
| 5,832,966 | A | 11/1998 | Nickens et al. |
| 5,868,174 | A | 2/1999 | Mattern |
| 5,900,216 | A | 5/1999 | Nickens et al. |
| 5,901,759 | A | 5/1999 | Nickens et al. |
| 5,918,649 | A | 7/1999 | Johse |
| 5,934,511 | A | 8/1999 | Ausmus |
| 5,957,168 | A | 9/1999 | Nickens et al. |
| 5,967,012 | A | 10/1999 | Dummer et al. |
| 5,979,709 | A | 11/1999 | Liccioni |
| 5,992,475 | A * | 11/1999 | Campbell ........... B65B 69/0041 141/329 |
| 6,000,391 | A | 12/1999 | Timmons |
| 6,013,121 | A | 1/2000 | Chiu et al. |
| 6,041,506 | A | 3/2000 | Iwao |
| 6,053,362 | A | 4/2000 | Lin |
| 6,139,806 | A | 10/2000 | Nickens et al. |
| 6,164,344 | A | 12/2000 | Nickens et al. |
| 6,219,925 | B1 | 4/2001 | Chen |
| 6,240,981 | B1 | 6/2001 | Nickens et al. |
| D446,816 | S | 8/2001 | Hsuan |
| 6,308,748 | B1 | 10/2001 | Nickens et al. |
| 6,318,252 | B1 | 11/2001 | Kao |
| 6,331,141 | B1 | 12/2001 | Chua |
| 6,393,900 | B1 | 5/2002 | Buckner, III et al. |
| D458,308 | S | 6/2002 | Hsuan |
| 6,412,384 | B1 | 7/2002 | Iwao |
| 6,422,273 | B1 * | 7/2002 | Campbell ............. B09B 3/0058 141/330 |
| 6,428,410 | B1 | 8/2002 | Campbell |
| 6,450,192 | B1 | 9/2002 | Romanek |
| 6,481,470 | B1 * | 11/2002 | Rubenic ................ B09B 3/0058 141/329 |
| 6,644,515 | B1 | 11/2003 | Campbell |

(56) References Cited

U.S. PATENT DOCUMENTS

| | | |
|---|---|---|
| 6,709,221 B2 | 3/2004 | Roura Adell et al. |
| 6,743,281 B1 | 6/2004 | Miller |
| 6,810,731 B1 | 11/2004 | Lo |
| 6,908,372 B2 | 6/2005 | Larson |
| 6,923,851 B1 | 8/2005 | Butler et al. |
| 6,941,979 B1 | 9/2005 | Potts et al. |
| 7,562,622 B2 * | 7/2009 | Babiel ................ B30B 1/24 100/266 |
| 7,690,130 B1 | 4/2010 | Risinger |
| D632,318 S | 2/2011 | Sindlinger |
| 7,930,947 B2 | 4/2011 | Counts |
| 7,946,010 B1 | 5/2011 | Myers et al. |
| D671,357 S | 11/2012 | Trombly |
| D675,237 S | 1/2013 | Broadbent et al. |
| D685,035 S | 6/2013 | Kanbar |
| D690,332 S | 9/2013 | Morehead et al. |
| 8,997,617 B2 | 4/2015 | Thomson |
| D737,904 S | 9/2015 | Kuehne |
| 9,314,661 B1 | 4/2016 | Chen |
| D761,673 S | 7/2016 | Allen et al. |
| 2002/0170861 A1 | 11/2002 | Monsrud et al. |
| 2003/0027699 A1 | 2/2003 | Brodie et al. |
| 2003/0189002 A1 | 10/2003 | Proulx et al. |
| 2004/0038096 A1 | 2/2004 | Chou et al. |
| 2004/0045424 A1 | 3/2004 | Ikeda et al. |
| 2006/0191422 A1 | 8/2006 | Dorion |
| 2007/0005072 A1 | 1/2007 | Castillo et al. |
| 2007/0068352 A1 | 3/2007 | Morgan |
| 2007/0180723 A1 | 8/2007 | Morgan |
| 2008/0173086 A1 | 7/2008 | McQuaid |
| 2008/0295562 A1 | 12/2008 | Straka |
| 2008/0314220 A1 | 12/2008 | Ferry et al. |
| 2009/0050121 A1 | 2/2009 | Holzmann et al. |
| 2009/0223032 A1 | 9/2009 | Huang et al. |
| 2010/0095815 A1 | 4/2010 | Laib et al. |
| 2011/0016733 A1 | 1/2011 | Peretti |
| 2011/0265655 A1 | 11/2011 | Schuster et al. |
| 2012/0024771 A1 | 2/2012 | Abdalla et al. |
| 2012/0094810 A1 | 4/2012 | Anderson |
| 2012/0121751 A1 | 5/2012 | Atagi et al. |
| 2012/0210689 A1 | 8/2012 | Rogers et al. |
| 2013/0042944 A1 * | 2/2013 | Campbell ............. B09B 3/0058 141/65 |
| 2013/0109545 A1 | 5/2013 | Chen |
| 2013/0209338 A1 | 8/2013 | Prasad et al. |
| 2014/0018213 A1 | 1/2014 | Chen |
| 2014/0109742 A1 | 4/2014 | Elsmore et al. |
| 2014/0121075 A1 | 5/2014 | Brown |
| 2014/0162850 A1 | 6/2014 | Chen |
| 2014/0202375 A1 | 7/2014 | Goff |
| 2015/0273384 A1 * | 10/2015 | Campbell ......... B01D 53/0407 96/117.5 |
| 2015/0298955 A1 * | 10/2015 | Campbell ............ B09B 3/0058 141/330 |
| 2016/0325222 A1 | 11/2016 | Campbell |
| 2016/0338712 A1 | 11/2016 | Chernosky et al. |

FOREIGN PATENT DOCUMENTS

| | | |
|---|---|---|
| DE | 4204836 C2 | 8/1993 |
| DE | 19932519 A1 | 5/2001 |
| EP | 417022 A1 | 3/1991 |
| EP | 550815 A1 | 7/1993 |
| FR | 616328 A | 1/1927 |
| SU | 821399 A1 | 4/1981 |
| WO | WO 92/18418 A1 | 10/1992 |
| WO | WO 96/22916 A1 | 8/1996 |
| WO | WO 97/48475 | 12/1997 |
| WO | WO 00/05137 A1 | 2/2000 |
| WO | WO 2009/156757 A1 | 12/2009 |
| WO | WO 2016/182976 A1 | 11/2016 |
| WO | WO 2017/030540 A1 | 2/2017 |
| WO | WO 2017/058229 A1 | 4/2017 |

OTHER PUBLICATIONS

U.S. Patent and Trademark Office, International Search Report in International Application No. PCT/US1999/016418 (dated Nov. 4, 1999).

Aerosol Can Disposal—retrieved from https://americangasproducts.com/aerosol-can-disposal, 4 pgs. (Copyright 2015).

U.S. Patent and Trademark Office, International Search Report in International Application No. PCT/US2015/045366 (dated Nov. 24, 2015).

U.S. Appl. No. 29/547,478, Michael C. Campbell, filed Dec. 3, 2015.

U.S. Appl. No. 29/546,867, Michael C. Campbell, filed Nov. 25, 2015.

U.S. Appl. No. 61/940,810, Michael C. Campbell, filed Feb. 17, 2014.

U.S. Appl. No. 61/973,374, Michael C. Campbell, filed Apr. 1, 2014.

U.S. Appl. No. 62/063,885, Michael C. Campbell, filed Oct. 14, 2014.

U.S. Appl. No. 62/158,928, Michael C. Campbell, filed May 8, 2015.

* cited by examiner

PUNCTURING DEVICE FOR AEROSOL CONTAINERS

CROSS REFERENCE TO RELATED APPLICATION

This application claims the benefit of U.S. Provisional Application No. 62/063,885, filed Oct. 14, 2014 for "Puncturing device for aerosol containers and improved filter", and U.S. Provisional Application No. 61/940,810, filed Feb. 17, 2014 for "Puncturing device for aerosol containers", both incorporated by reference herein in their entirety.

BACKGROUND OF THE INVENTION

1. Field of the Invention

This invention relates generally to the art of waste disposal, and more specifically to devices for relieving aerosol cans of pressure and emptying them of residual contents in preparation for disposing or recycling them.

2. Description of Related Art

This invention has uses in the area of waste disposal, such as in devices and systems for evacuating aerosol cans, and other containers of pressurized gases and residue contents.

Pressurized aerosol cans, and other pressurized containers, have widespread usage in homes and industry. It has long been recognized that improper disposal of such containers constitutes a safety hazard in that excessive external heat and/or pressure can cause them to explode if they have not been relieved of internal pressure. Similarly, the release of contents, both propellant gases and dangerous residue materials, from such containers, often damages the environment. In addition, it has long been recognized that disposing of such containers often constitutes an environmental hazard because of their dangerous contents.

Due to these hazards, the Environmental Protection Agency (EPA), an agency of the U.S. Government, regulates disposal of pressurized containers as well as their contents for industries. These regulations mandate that certain businesses and industries must puncture all pressurized containers prior to their disposal. Further, these regulations require that certain contents of pressurized containers be captured and disposed of in particular manners. Depending upon the natures of such contents, disposal methods can involve permanent disposal through incineration, landfills or other means; treatment and permanent disposal; treatment and recycling; and treatment and reclamation for a new use. An example of reclamation would be recovering a solvent contained in waste paint for use as a fuel. But, whichever disposal method is used, the EPA requires many industries to relieve the pressure in pressurized containers prior to transporting them for disposal.

In addition to the above requirements of the EPA, many states within the United States and countries outside the United States have requirements similar to, or even stricter than, those of the EPA. For example, California closely regulates release of gases into the atmosphere. In this respect, California considers some propellants used in aerosol cans to be contaminants, particularly when they contain small aerosolized particles of materials, such as insecticides, paints and the like, which were in the aerosol cans.

Further, while EPA regulations do not apply to individuals and many small businesses, many of these still desire to dispose of hazardous contents of such containers, and the containers themselves, in a manner which provides personal safety and protects the environment, and would do so if a reliable, inexpensive apparatus therefor exists.

There have been a number of prior-art devices suggested for piercing pressurized containers such as are described in U.S. Pat. No. 3,303,968 to Compere; U.S. Pat. No. 3,333,735 to Odasso; U.S. Pat. No. 3,828,976 to Sidelinker; U.S. Pat. No. 3,926,340 to Tygenhof; U.S. Pat. No. 4,500,015 to Penney, and U.S. Pat. No. 4,934,055 to Chambers. Some of these devices do not adequately provide for disposal of gases and residual contents of the pressurized containers, such as the devices of Compere, Sidelinker, Odasso, Tygenhof and Penney.

The device of Chambers (U.S. Pat. No. 4,934,055) does provide for disposal of contents of pressurized cans, however, this device appears to be somewhat limited in application having an unduly small, custom-built, reservoir and apparently requiring an undue amount of strength and dexterity to operate. Also, the device of this patent does not appear to be sufficiently durable to withstand repeated use.

A number of U.S. patents to Michael Campbell describe systems for evacuating gaseous materials from aerosol containers and other types of containers, see U.S. Pat. Nos. 5,163,585; 5,265,762; and 5,992,475. Most of these systems involve sealing a wall of an aerosol can on a seat, puncturing the can below the seat, and evacuating the contents of the can into a drum.

The device disclosed in another Campbell patent, U.S. Pat. No. 5,163,585, discloses a device for puncturing aerosol containers. In this device, the container is punctured in the side which does not allow for complete emptying of the container. Additionally, the container being emptied is not sealed such that leakage of the contents is possible.

A widely used device for piercing pressurized containers is described in U.S. Pat. No. 5,265,762 to Campbell et al. This Campbell et al. patent describes a puncturing device for aerosol containers which includes an elongated tubular housing having male threads at a second end for being screwed into a first, or large, bung-plug hole (bunghole) of an off-the-shelf drum, such as a 15, 30 or 55 gallon drum. An aerosol can to be disposed of is inserted into a first opening at a first end of the cylindrical housing, nozzle-end-first, until a shoulder of the aerosol can engages a sealing shoulder seat in the elongated tubular housing. A puncturing member, as part of a mechanism mounted to the side of the housing, is driven through the housing to create a puncture opening in the aerosol can below the sealing shoulder seat. Propelling gas and residue material are driven from the aerosol can, by pressure of the propellant gas, through the puncture opening and through the second end opening of the housing into the drum. The sealing shoulder seat prevents the propellant gas and residue from retro-movement toward the first end opening of the housing (which opens to the environment) and ensures that these materials go into the drum.

Campbell et al (U.S. Pat. No. 5,265,762) also describes a filter screwed into a second, small, bunghole of the drum for filtering propellant gases escaping from the second bunghole of the drum to the environment for cleaning escaping gaseous vapors of atmosphere-harmful materials.

U.S. Pat. No. 5,992,475 to Campbell, discloses a spring-activated check valve at the second end of the tubular wall of the housing with a spring-activated valve poppet positioned at the second end for opening and closing in response to pressure. Basically this check valve opens to allow propellant gases to escape from the punctured aerosol cans into the drum and then closes to prevent retrograde movement of the gases from the drum back through the piercing-device housing once the cans are removed. U.S. Pat. No. 5,181,462 to Issac also describes a similar valve.

Other patents which describe devices and systems relating to the system described in Campbell et al (U.S. Pat. No. 5,265,762) include U.S. Pat. No. 3,358,883 to Loe; U.S. Pat. No. 3,828,976 to Sidelinker; U.S. Pat. No. 3,926,340 to Tygenhof; U.S. Pat. No. 4,349,054 to Chipman et al; U.S. Pat. No. 5,114,043 to Collins, Jr.; U.S. Pat. No. 5,181,462 to Isaac; U.S. Pat. No. 5,271,437 to O'Brien et al; U.S. Pat. No. 5,284,997 to Spearman et al; U.S. Pat. No. 5,309,956 to Hajma; U.S. Pat. No. 5,365,982 to O'Neill; and U.S. Pat. No. 6,422,273 to Campbell. Additional patent documents disclosing devices for puncturing pressurized cans and/or disposing of their contents include U.S. Pat. No. 5,067,529 to Gonzalez-Miller et al., U.S. Pat. No. 4,459,906 to Cound et al., and U.S. Pat. No. 4,407,341 to Feldt et al. as well as Soviet patent document 821399 and German Offenlegungsschrift 1,607,991. All of these patent documents disclose relatively complicated, expensive, and large machines.

It is an object of the invention to provide a device for puncturing a pressurized container to relieve the pressure therein and for releasing gases and residual contents thereof into a collection receptacle which is not unduly complicated, which can be easily transported to a site and installed thereat, which is relatively easy and convenient to use requiring no outside power, which can be used with off-the-shelf receptacles in common us, which is relatively inexpensive to manufacture, which operates in a manner complying with EPA regulations in a safe and efficient manner, and which can accommodate pressurized containers of various sizes.

It is another object of the invention to provide a device for puncturing a pressurized container to relieve the pressure therein along with completely emptying the contents thereof.

It is another object of the invention to provide a device for puncturing a pressurized container to remove all contents in order to minimize the opportunity for the contents to catch fire.

It is yet another object of this invention to render aerosol cans recyclable as scrap metal in safe condition for handling, with no shredded metal shards or sharp protrusions.

Finally, it is an object of the present invention to accomplish the foregoing objectives in a simple and cost effective manner.

The above and further objects, details and advantages of the invention will become apparent from the following detailed description, when read in conjunction with the accompanying drawings.

SUMMARY OF THE INVENTION

The present invention addresses these needs by providing a device for puncturing a pressurized container for relieving the pressure therein and for releasing the residual contents thereof into a drum of a type having an end wall with a surrounding protruding peripheral rim. The device includes a generally elongated housing member defining an elongated cavity with inner and outer surfaces and with openings at first and second ends thereof for receiving a pressurized container at the first end and further includes an attachment means for securing the second end of the elongated housing member to the end wall of the drum for collection by the drum of contents expelled from the pressurized container through the second end. A puncturing member mounted within the elongated housing member generally parallel to the inner and outer surfaces of the elongated housing member, intermediate the first and second ends and a distance from the inner surface of the elongated housing member for piercing the pressurized, container in the elongated cavity whereby gases and residual contents thereof are emptied into the drum through the opening at the second end. A force-applying member is movably mounted on the elongated housing member for engaging the pressurized container positioned in the elongated cavity and forcing the pressurized container towards the second end of the elongated housing member and onto the puncturing member. The device further includes auxiliary support means for extending from the elongated housing member to the protruding peripheral rim of the drum for stabilizing relative movement between the elongated housing member and the drum during operation of the device. The attachment means is preferably a threaded terminus of the elongated housing member for engaging threads of the end wall of the drum. The auxiliary support means may include a locking member to prevent the device from being removed from the drum. The elongated housing member, the force-applying member and the device further including an auxiliary support means are of aluminum or may be coated with a non-stick coating. The puncturing member preferably comprises a hollow puncturing pin, the pointed tip of which is preferably of a non-sparking metal, extending upward towards the first end of the elongated housing member, and includes a spring for biasing the pressurized container towards the first end of the elongated housing member when the force-applying member is not engaged with the pressurized container with gases and residual contents being emptied into the drum through the hollow puncturing pin. The elongated housing member further comprises a shelf member extending from the inner surface of the elongated housing member which shelf member includes an opening through which the puncturing member extends the first end of the elongated housing member. An alignment member is preferably mounted within the elongated cavity intermediate the first and second ends and through which the puncturing member extends such that the pressurized container is retained in an orientation which is generally parallel to a lengthwise center line of the elongated cavity. The device may include a counter means, preferably enclosed within a housing, cooperatively engaged with the puncturing means wherein the counter means records each piercing of the pressurized container and the counter means may be reset to its initial counter setting. In a particularly preferred embodiment, the force-applying member, comprises includes a cap, rotatable about a pin between a position directly over the elongated housing member and a position which is not over the elongated housing member, a rack gear attached to the cap, a paw gear interconnected with the rack gear such that rotation of the paw gear causes vertical movement of the rack gear, and an activation wheel attached to the paw gear such that rotation of the activation wheel causes rotation of the paw gear wherein rotation of the activation wheel results in vertical movement of the cap, and downward movement of the cap causes the cap to engage the pressurized container positioned in the elongated cavity and to force the pressurized container towards the second end of the elongated housing member and onto the puncturing member. A locking member releasably retains the cap in position directly over the elongated housing member. The cap further includes a height adjustment member, which may include a recessed magnetic member. The rack gear, the paw gear, and the activation wheel are of aluminum or may be coated with a non-stick coating

BRIEF DESCRIPTION OF THE DRAWINGS

A more complete description of the subject matter of the present invention and the advantages thereof, can be achieved by reference to the following detailed description by which reference is made to the accompanying drawings in which.

Figure 1A:
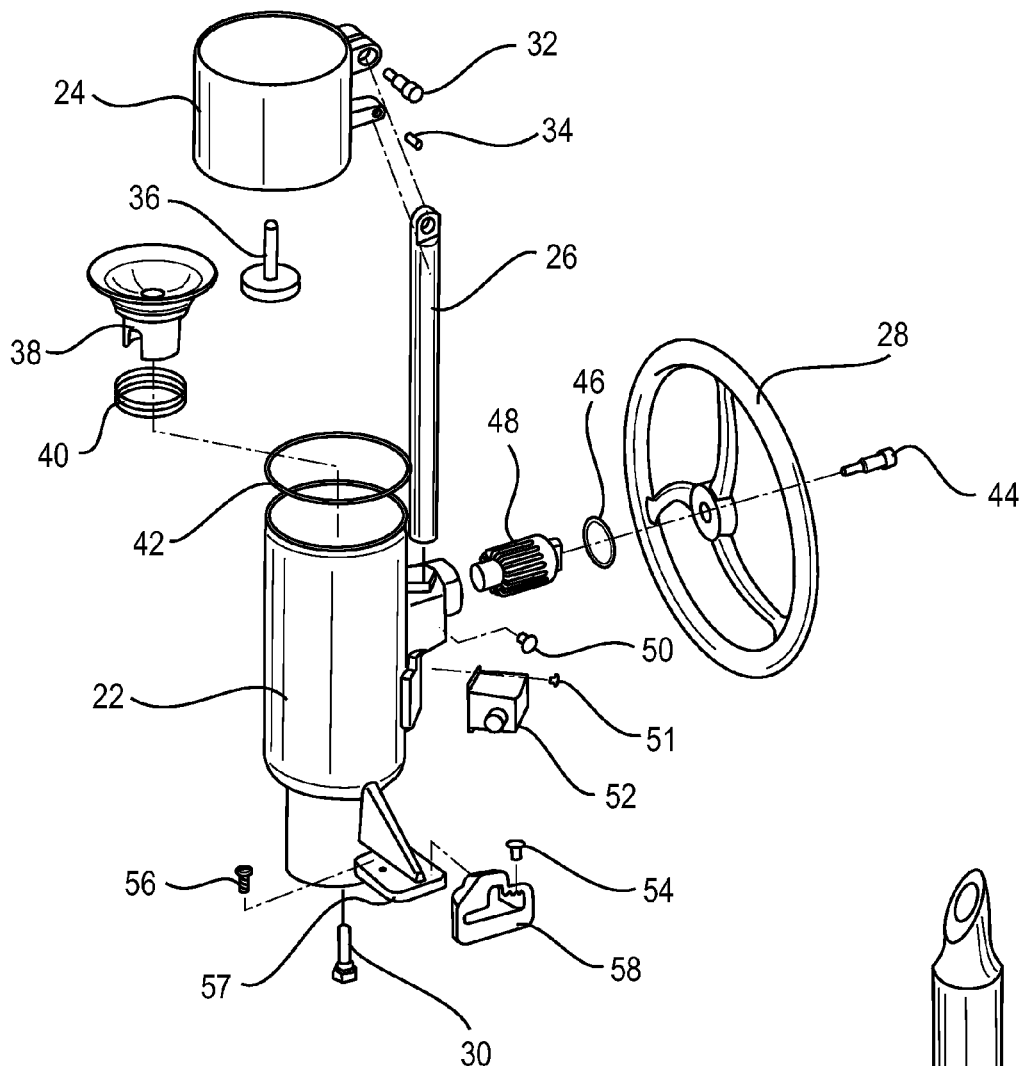
FIG. 1a is a perspective, exploded view of a first-embodiment device of this invention.

ELEMENT LISTING 20 pressurized container
22 elongated housing member
24 cap
26 rack gear
28 activation wheel
29 shelf member
30 puncturing member
32 shoulder pin
34 spring pin
36 height adapter
38 alignment cone
40 compression spring
42 o-ring
44 shoulder pin
46 retaining ring
48 paw gear
50 tamper proof fastener
51 screw
52 counter
54 tamperproof fastener
56 grounding screw
57 auxiliary support member
58 locking tab
60 collection receptacle
61 filter
62 contents
64 handle
66 pin

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating general principles of embodiments of the invention. The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

Generally, as shown in FIGS. 1-11, the invention is a device for puncturing a pressurized container 20 for relieving the pressure therein and for releasing the gases and residual contents thereof directly down into a collection receptacle 60 which device comprises an elongated housing member 22 defining an elongated cavity with first and second openings at first and second ends thereof for receiving an inverted pressurized container 20 in the first opening, the housing member 22 including an auxiliary support member 57 for securing the second end of the housing member 22 to a receptacle 60 for collecting contents 10 expelled when a hollow puncturing member 30, which is mounted within the housing member 22 in an orientation generally parallel to the pressurized container 20 and the elongated housing member 22 and which is cooperatively engaged with a counter 52, extends through the intermediate aperture and pierces a pressurized container 20 in the cavity. The counter 52 acts to record the actions of the puncturing member 30. The housing member 22 preferably further defines a shelf member 29 extending from the inner surface of the elongated housing member 22 which shelf member 29 includes an opening through which the puncturing member 30 extends towards the first end of the elongated housing member 22. The puncturing member 30 is mounted within the housing member 22 such that it punctures the pressurized container 20 at the lowest possible location to essentially completely evacuate all contents 10. An o-ring 42 is included at the first end of the housing member 22 for forming a seal between the housing member 22 and the pressurized container 20. An alignment cone 38 is positioned within the housing member 22 near the second end of the housing member 22 and through which the puncturing member 30 extends to align the pressurized container 20 within the housing member 22.

Figure 1B:
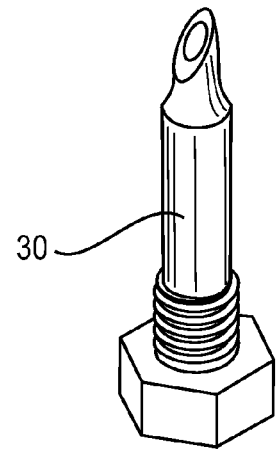
FIG. 1b is an enlarged side view of the puncturing member of the first embodiment device of this invention.
Figure 2:
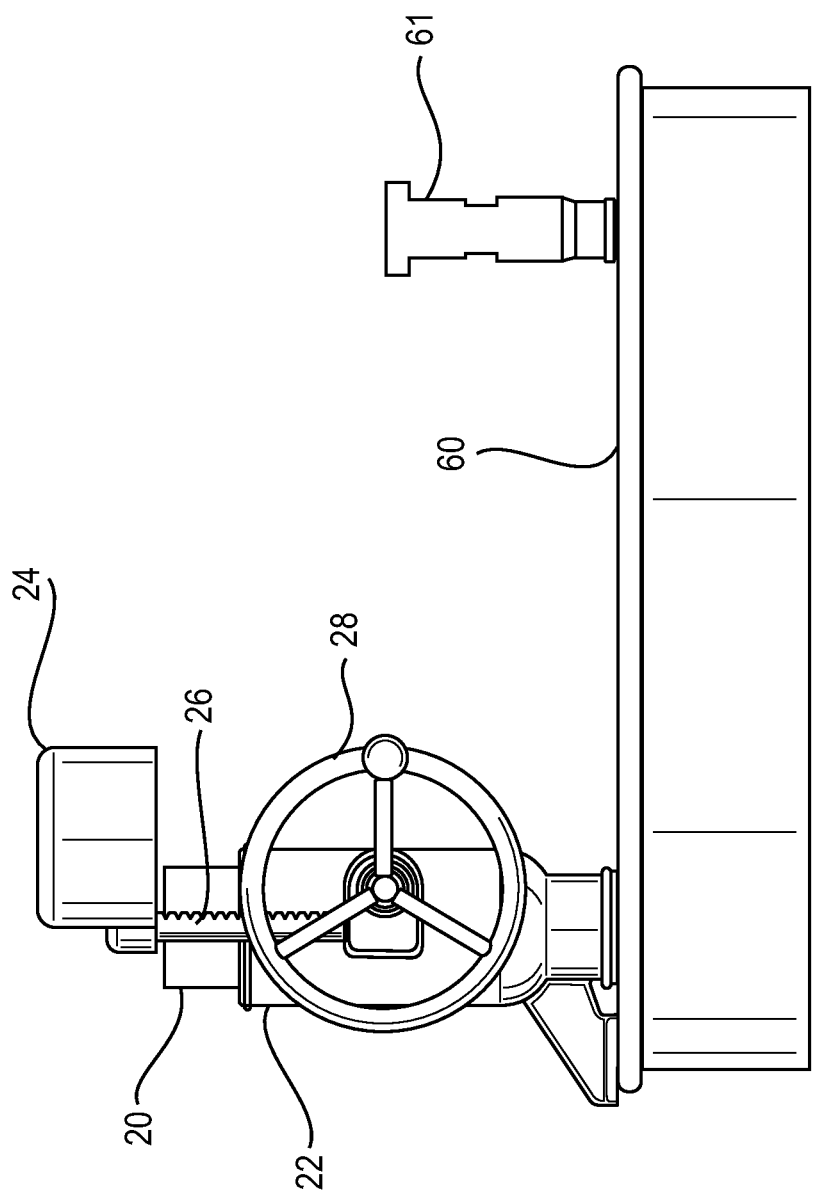
FIG. 2 is a side view of the first embodiment device of this invention installed for operation.

As shown generally in FIG. 1, a device for puncturing a pressurized container 20 for relieving the pressure therein and for releasing into a collection container or receptacle 60 the gases and residual contents thereof generally comprises an elongated housing member 22, a puncturing member 30, a counter 52, a cap 24, and an auxiliary support member 57.

The generally elongated housing member 22 defines an elongated cavity with first and second openings at first and second ends thereof. The elongated housing member 22 has a shelf member 29 extending from the inner surface of the elongated housing member 22. The shelf member 29 includes an opening from which the puncturing member 30 extends towards the first end of the elongated housing member 22 positioned between the first and second open ends towards the second open end of the housing member 22.

As can be seen in FIG. 1, the elongated housing member 22, below the shelf member 29, defines a reduced cross-sectional area to allow for a connection between the elongated housing member 22 and the collection receptacle 60. The elongated housing member 22 further includes a threaded terminus, with male threads thereon near the second end of the housing member 22 which is dimensioned, and which has a thread pitch, for selectively engaging and disengaging a female threaded bung of the collection receptacle 60, such as a standard off-the-shelf 5 gal., 20 gal., 30 gal., 55 gal. drum 38 and others (although other embodiments can be sized and threaded to fit other collection containers or receptacles). In this regard, the standard off-the-shelf drums mentioned above all have 2 inch filling or spout bung holes with standard threads as well as ¾ inch venting bung holes, also with standard threads. Similarly, drums meeting standards of other countries also usually have large and small threaded bung holes.

The puncturing member 30 comprises a hollow elongate pin having a puncturing end and which is mounted through an opening in the shelf member 29 such that the puncturing end extends upward toward the first end of the elongated housing member 22. The puncturing member 30 further includes a spring which biases the pressurized container 20 towards the first end of said elongated housing member 22 when the pressurized container 20 is not being forced towards the second end of the housing member 22. The puncturing pin is preferably hollow and beveled such that the initial puncture is smaller than the diameter of the pin. This provides control over the flow of materials from the pressurized container. Of particular import is that the puncturing pin punctures the pressurized container 20 in a direction which is generally parallel to the pressurized container 20. This improves the ability to empty the contents 62 of the pressurized container 20 completely and directly downward into a collection receptacle 60. The device punctures the pressurized container 20 at slightly off of the dead center of the domed top of the pressurized container 20 to achieve maximum depletion of the contents 62 of the pressurized container.

In order to force the pressurized container 20 down onto the puncturing member 30, a cap 24 is placed into contact with the bottom end of the pressurized container 20 which extends from the elongated housing member 22 upon insertion of the top end of the pressurized container 20 into the housing member 22. If needed or desired, a height adapter 36 may include a magnet recessed into its lower end which then may be attached to the inside of the cap 24. The adapter 36 enables the emptying of pressurized containers 20 of different heights and also, by relying on magnetic attraction, assists in removing shorter pressurized containers 20 that that fit entirely within the housing member 22. The cap 24 is rotatably mounted to a rack gear 26 such that the cap 24 may be swung away from the pressurized container 20 to provide sufficient room for inserting and removing the pressurized container 20 from within the elongated housing member 22. When rotated over the pressurized container 20, a spring pin 34 locks the cap 24 in place. The cap 24 is then brought into contact with the pressurized container 20 by activation of the rack gear 26 through a paw gear 48 by an activation wheel 28. As the wheel 28 is turned, the paw gear 48 interacts with teeth on the rack gear 26 to lower the cap 24, thus applying force to the pressurized container 20 to cause the puncturing member 30 to puncture the pressurized container 20 allowing the contents 10 of the pressurized container 20 to exit directly down into the collection receptacle 60. A single turn of the activation wheel 28 fully raises or lowers the cap 24, depending on the direction of the turn. The device generated in excess of 1000 pounds of downward force with minimal operator input. If desired, a tamper proof fastener 50 may be utilized to lock the paw gear 48 in place to prevent use of the device.

Cooperatively engaged with the puncturing member 30 is the counter 52. The counter 52 cooperates with the puncturing member 30 such that with each puncture made by the puncturing member 30, the counter 52 records such puncture. A pressurized container 20 requires one action of the puncturing member 30 to completely empty the container 20 of contents 62. It is critical to record each action of the puncturing member 30 as certain elements of the device, such as a filter 61 (described below require replacement after a specific number of punctures. Additionally, maintenance must be performed on the device after a specific number of actions of the puncturing member 30. The counter 52 may preferably be capable of being reset to facilitate the recordal of puncturing actions. In a further preferred embodiment, the counter 52 is enclosed in a housing to prevent accidentally or unintentionally resetting the counter 52. An example of a counter which may be employed in this device is described in co-pending U.S. patent application Ser. No. 13/212,346, filed Aug. 18, 2011 for "GAS EVACUATION SYSTEM WITH COUNTER", which is incorporated herein by reference in its entirety.

The auxiliary support member 57 extends from the outer surface of the second end of the elongated housing member 22 for stabilization of the device in use and, optionally, for locking the device to the collection receptacle 60. The auxiliary support member 57 includes a grounding screw 56 to which an electrical wire can be attached. It should be noted that the foot of the auxiliary support member 57 is spaced immediately adjacent, or just a little above, the threads of the threaded terminus of the elongated housing member 22. The auxiliary support member 57 optionally includes a locking tab 58 for locking the device to the collection receptacle 60. A tamper proof fastener 54 provides additional support for locking the device to the collection receptacle 60 to prevent removal.

The device can be constructed of various materials, however, in a preferred embodiment, the major parts of the device, including the housing member 22, the rack gear 26, the activation wheel 28, the paw gear 48, the alignment cone 38 and the auxiliary support member 57 are formed of aluminum, preferably, hardened aircraft aluminum, so that they are light in weight. In order to improve wear, minimize static conductivity and protect against potential sparking, these elements are also coated with an industrial non-stick coating. Alternatively, these parts can be manufactured entirely from a material which resists sparking. The o-ring 42 is a typical o-ring made from an elastomeric material. In a preferred embodiment, the puncturing member 30 is made from low carbon content stainless steel. Also, in a preferred embodiment the pointed tip of the puncturing member 30 is made of stainless steel or of some other spark minimizing alloy, to minimize sparking and thereby promote safety.

In operation, the device is mounted on a collection receptacle 60, such as a common off-the-shelf drum (typically a 55 gal. or 30 gal. drum) by screwing the threaded terminus of the elongated housing member 22 into the normal female threaded, 2 inch, filling bung opening of the collection receptacle 60.

A filter 61, which can be part of a kit including the puncturing device, is mounted in the normal ¾ inch vent opening of the collection receptacle 60 for filtering escaping propellant gases and collecting gaseous vapors thereof. Upon operation, pressure in the punctured pressurized container 20 forces gases and residue material from the container 20 through the hollow core of the puncturing member 30 into the collection receptacle 60 to which the elongated housing member 22 is screwed. Propellants and other gases escape through the filter 61 and are thereby filtered, with gaseous vapors being collected. Possible filters for such use are described in U.S. Pat. No. 6,644,515 or U.S. Pat. No. 6,422,273, both issued to Campbell and incorporated herein by reference in their entirety. An improved filter is also described in provisional patent application Ser. No. 61/973, 374, filed Apr. 1, 2014 for "Improved filter for a propellant gas evacuation system" and provisional patent application Ser. No. 62/063,885, filed Oct. 14, 2014 for "Puncturing device for aerosol containers and improved filter", both incorporated by reference herein in their entirety.

Figure 3:
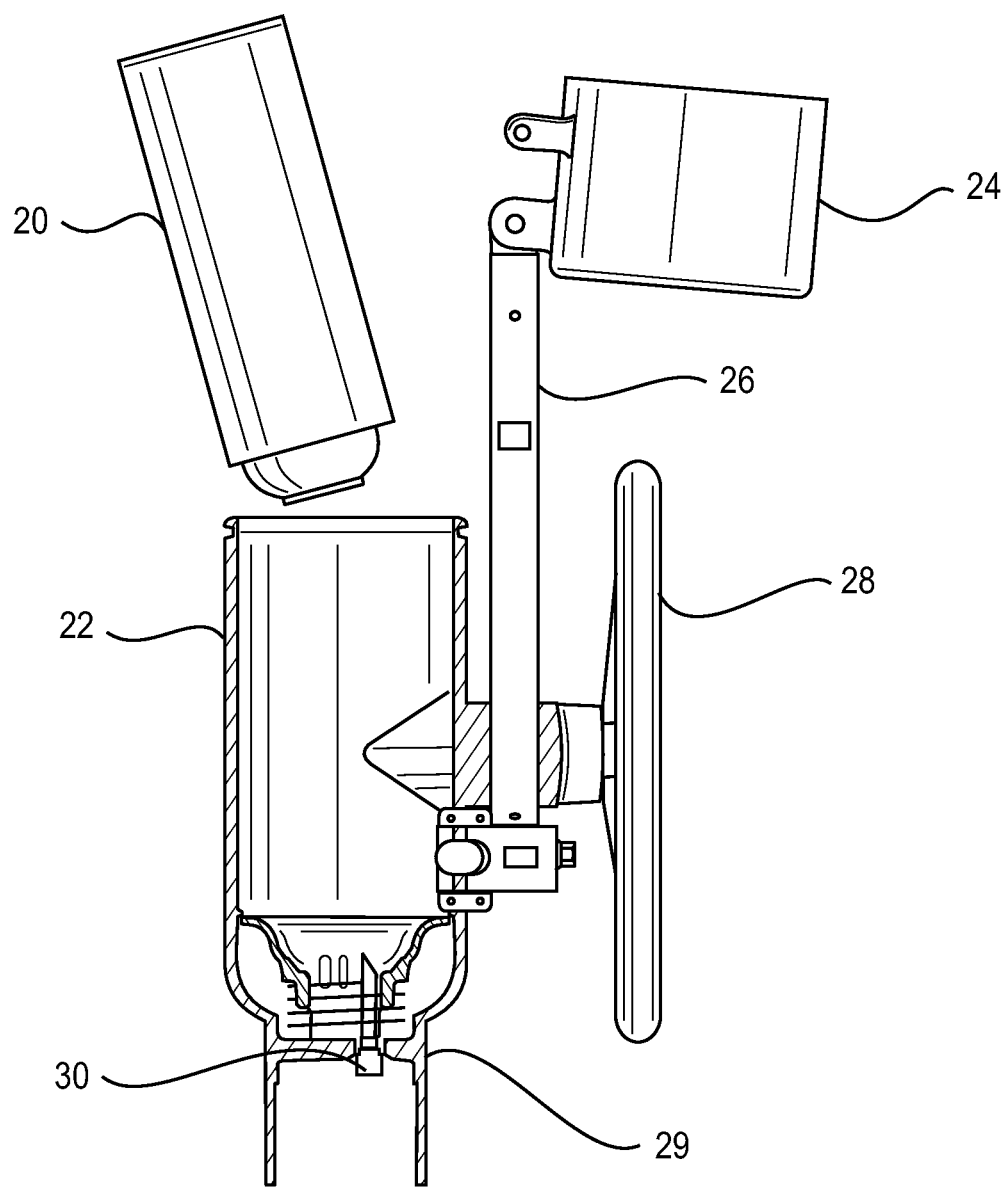
FIG. 3 is a side view showing the first step in operating the first embodiment device of this invention.
Figure 4:
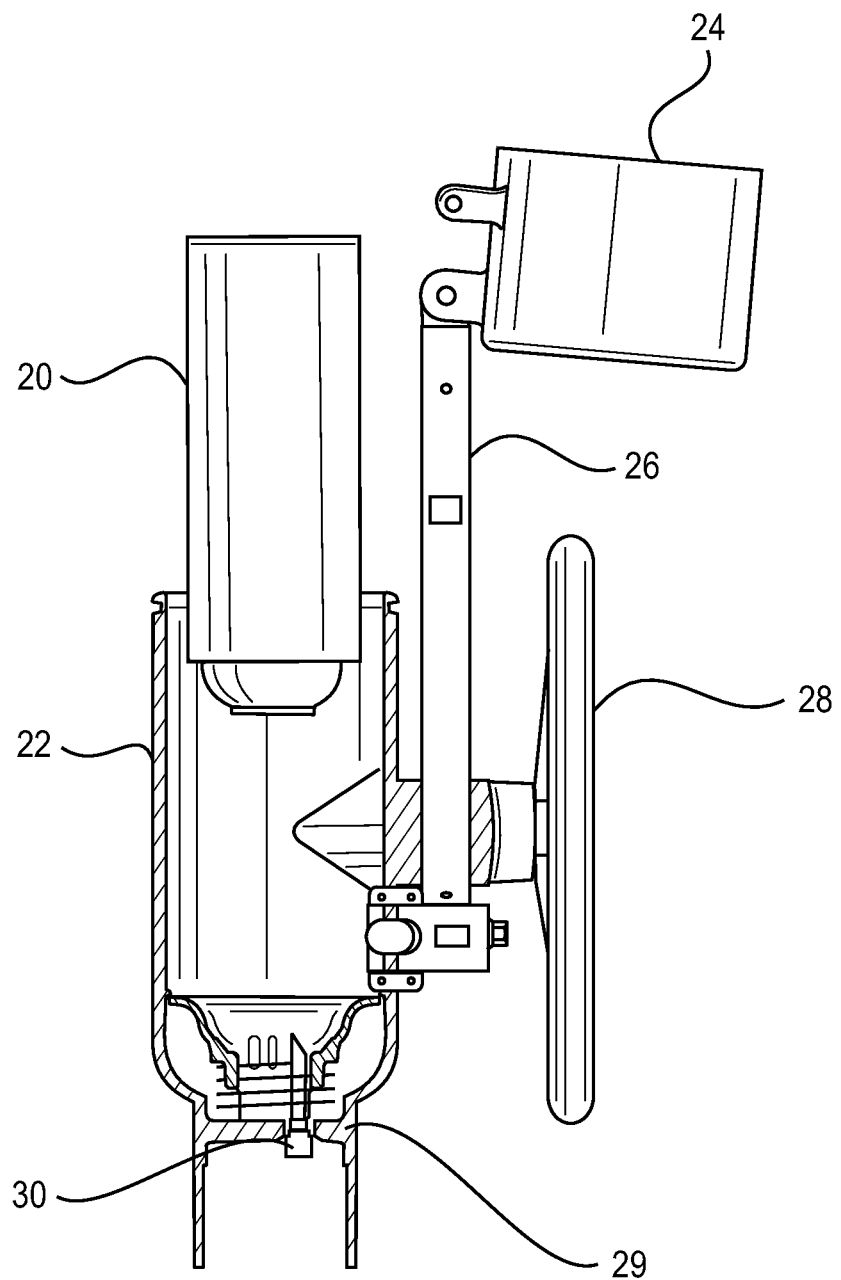
FIG. 4 is a side view showing the second step in operating the first embodiment device of this invention.
Figure 5:
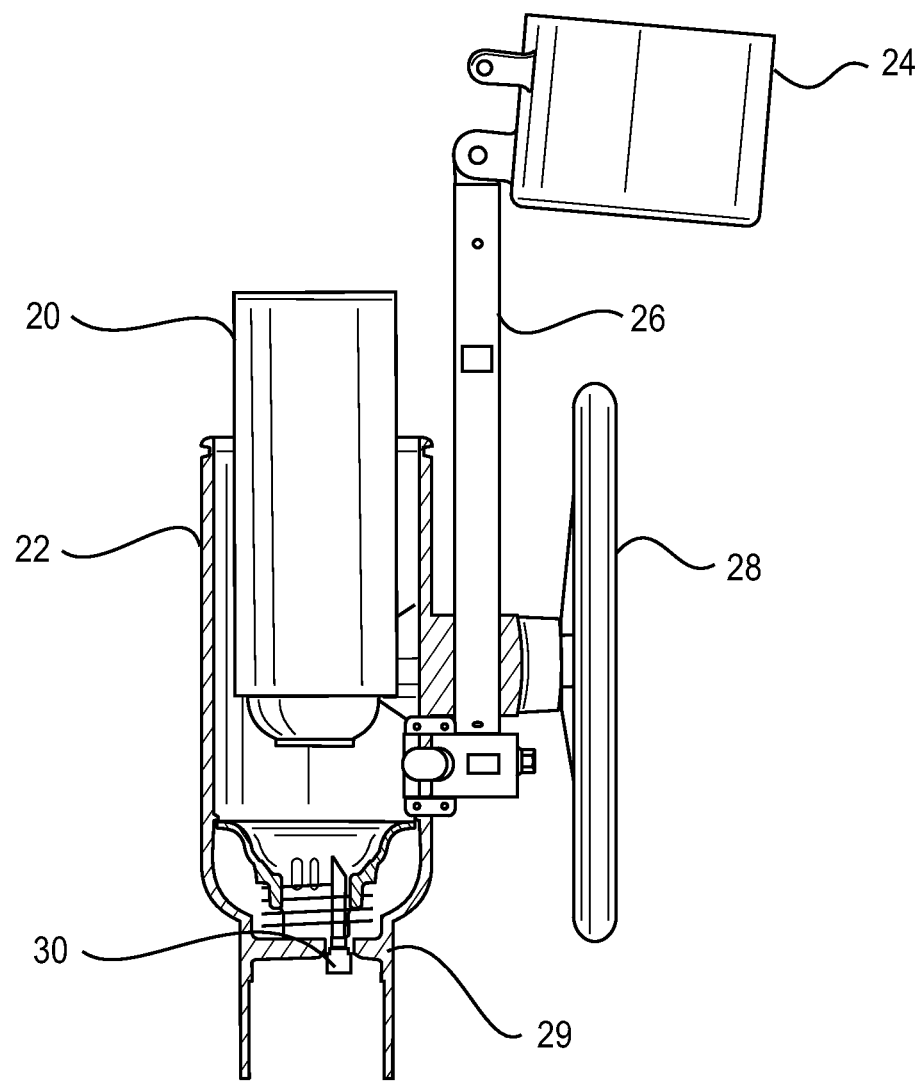
FIG. 5 is a side view showing the third step in operating the first embodiment device of this invention.
Figure 6:
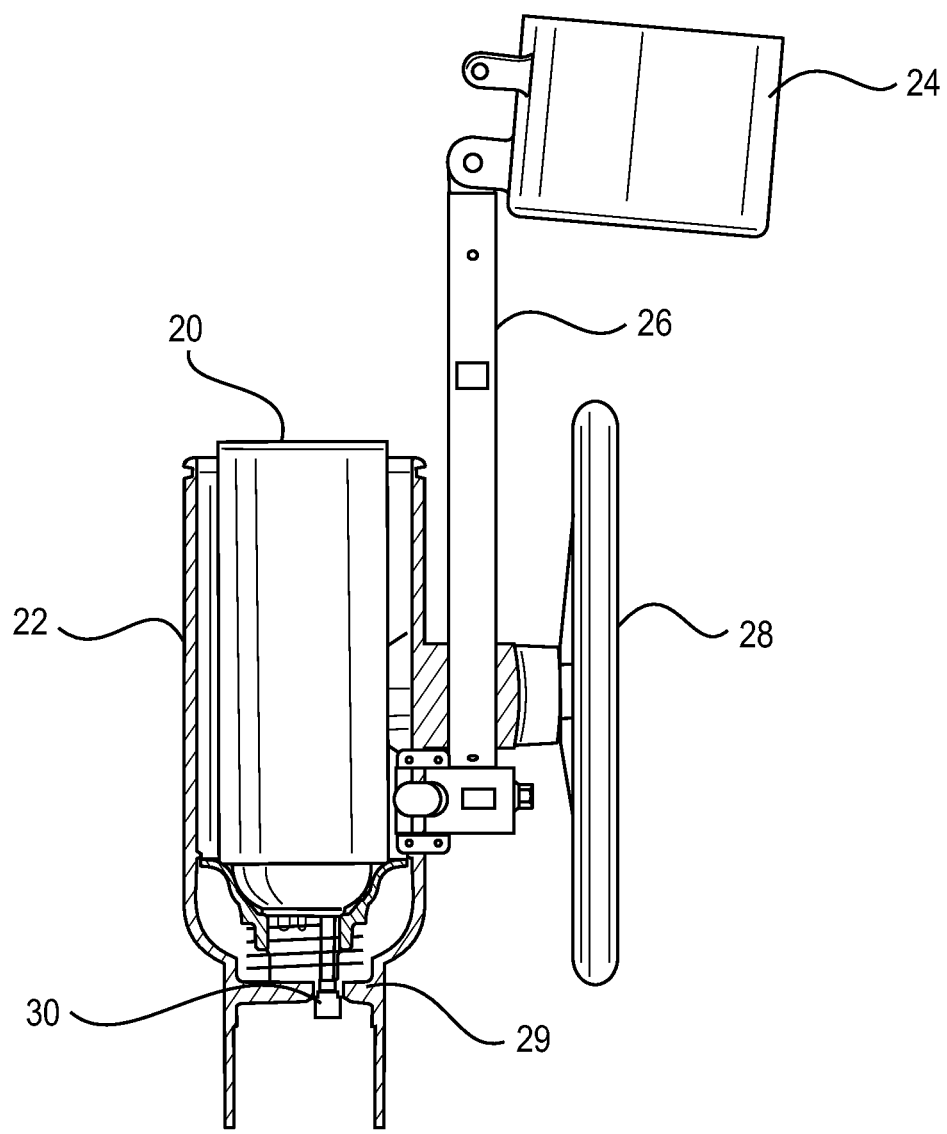
FIG. 6 is a side view showing the fourth step in operating the first embodiment device of this invention.
Figure 7:
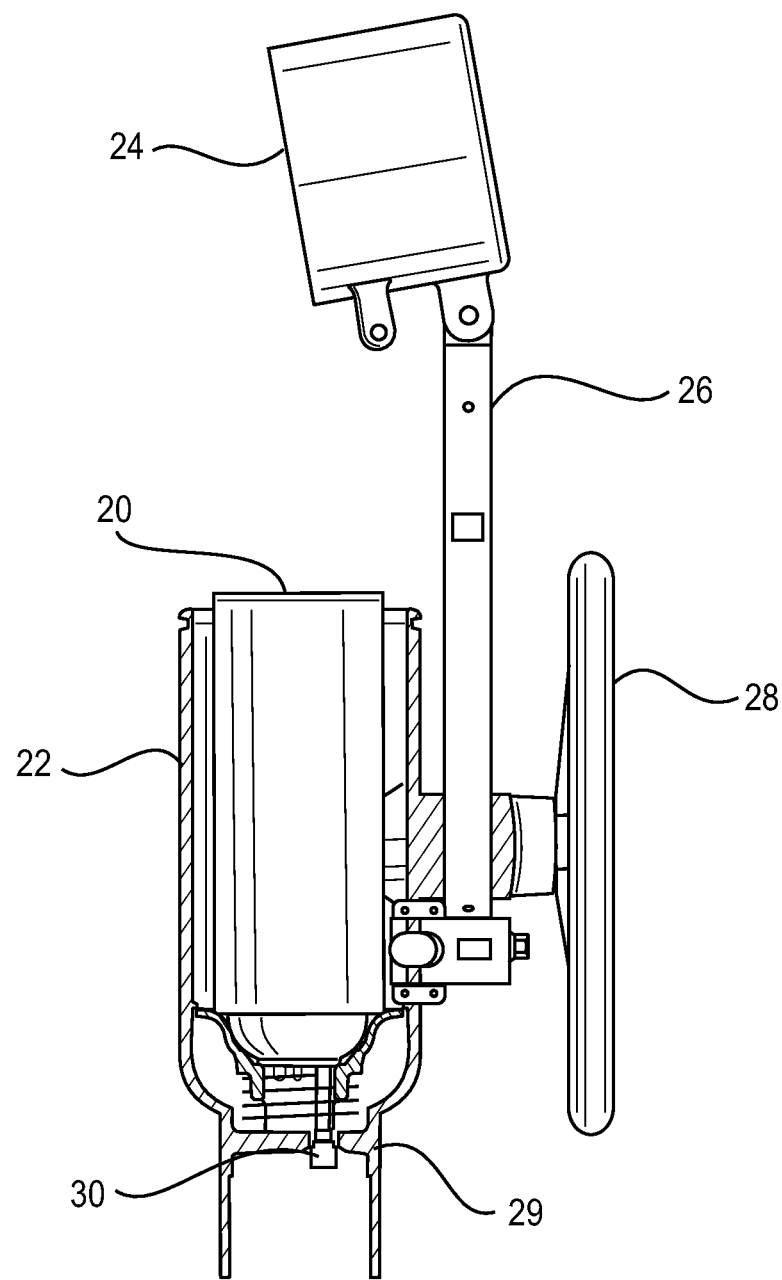
FIG. 7 is a side view showing the fifth step in operating the first embodiment device of this invention.
Figure 8:
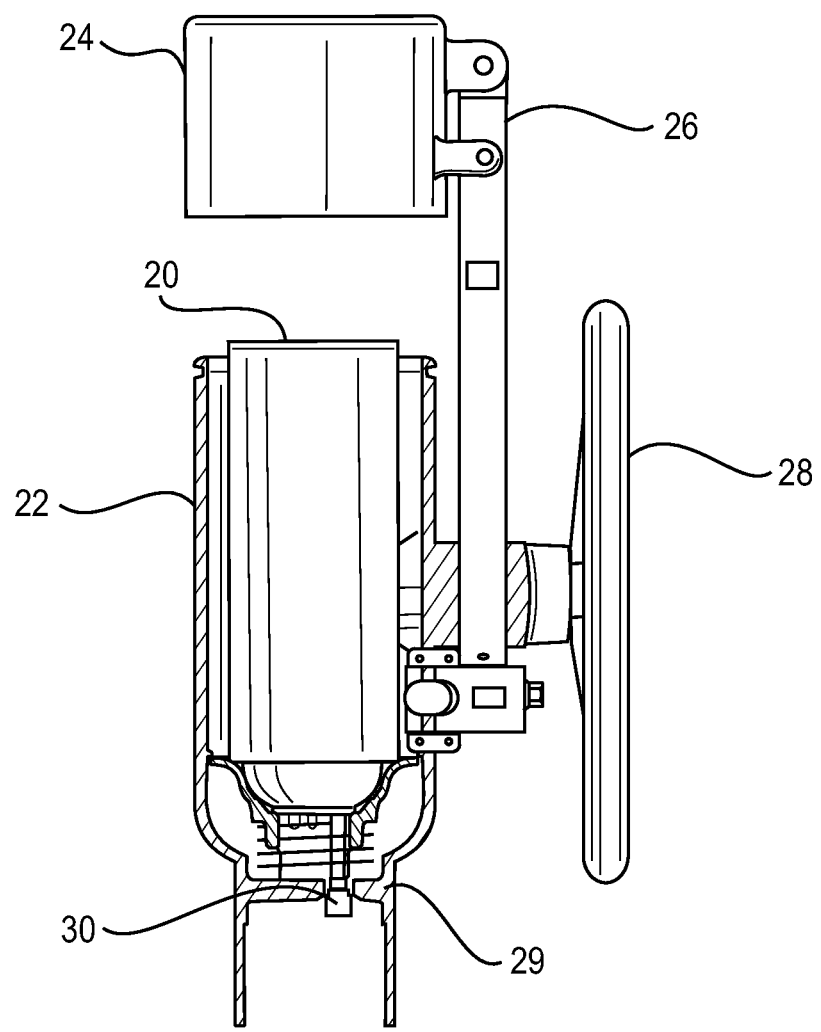
FIG. 8 is a side view showing the sixth step in operating the first embodiment device of this invention.
Figure 9:
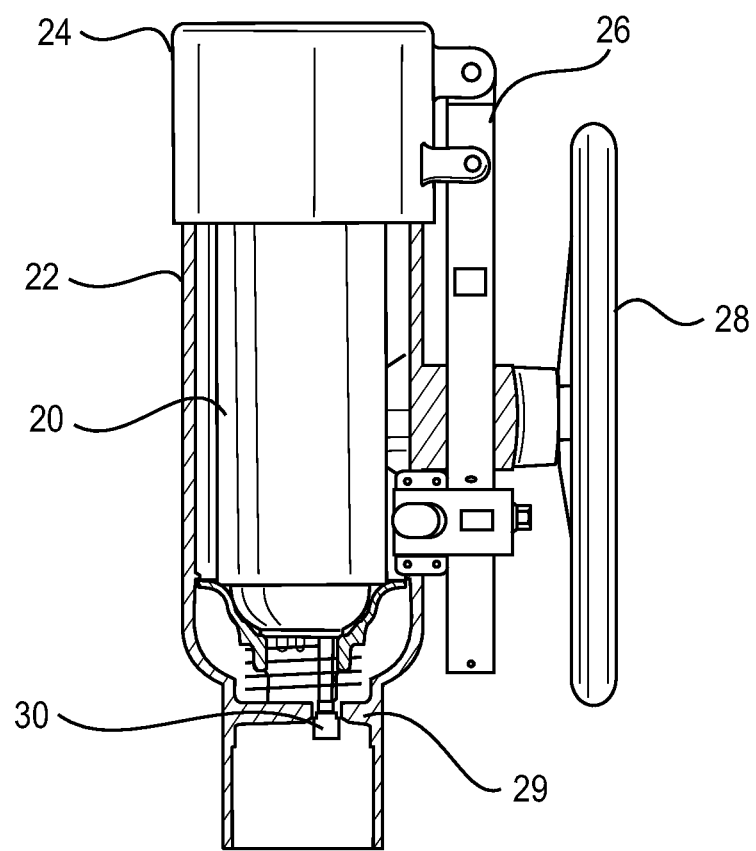
FIG. 9 is a side view showing the seventh step in operating the first embodiment device of this invention.
Figure 10:
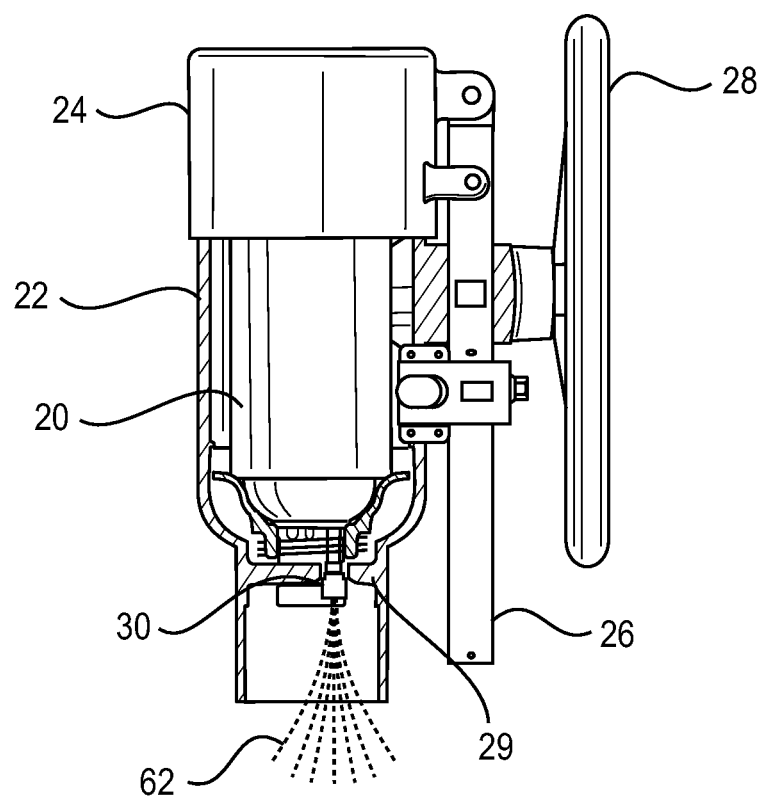
FIG. 10 is a side view showing the eighth step in operating the first embodiment device of this invention.

Operation of the device is shown in FIGS. 3-10. In FIG. 3, the rack gear 26 has been raised by rotating the activation wheel 28. The cap 24 has been rotated into a position away from the elongated housing member 22. The pressurized container 20 is placed into the elongated housing member 22 with the top of the pressurized container 20 positioned to enter the first opening of the elongated housing member 22. FIG. 4 shows the pressurized container 20 entering the elongated housing member 22, top first. At the step in the process, the cap 24 remains in position away from the first opening of the elongated housing member 22 and the rack gear 26 remains in its raised position. FIG. 5 shows the pressurized container 20 continuing towards the puncturing member 30. FIG. 6 shows the pressurized container 20 in contact with, but not yet punctured by the puncturing member 30. The alignment cone 38 acts to retain the pressurized container 20 in an orientation generally parallel to the elongated housing member 22. At this point, force is required to puncture the pressurized container 20. As shown in FIG. 7, the cap 24 is rotated towards the elongated housing member 22. FIG. 8 shows the completed rotation of the cap 24 such that the cap 24 is positioned directly over the elongated housing member 22 and the pressurized container 20. In FIG. 9, the cap 24 is in brought into contact with the pressurized container 20 by turning the activation wheel 28 which lowers the rack gear 26 and, in turn, the cap 24. As shown in FIG. 10, further turning of the activation wheel 28 forces the cap 24 downwards, thus forcing the pressurized container 20 to be punctured by the puncturing member 30, allowing the contents 62 of the pressurized container 20 to exit directly down into the collection receptacle 60.

Figure 11A:
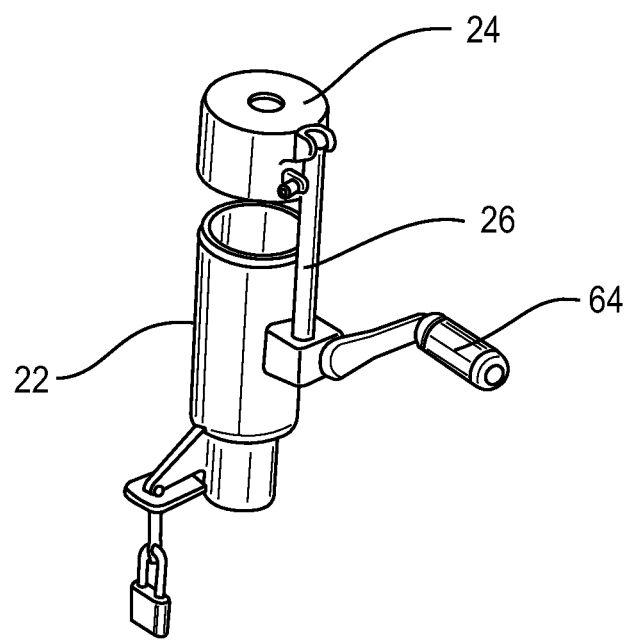
FIG. 11a is a perspective view showing an alternate embodiment device of this invention.
Figure 11B:
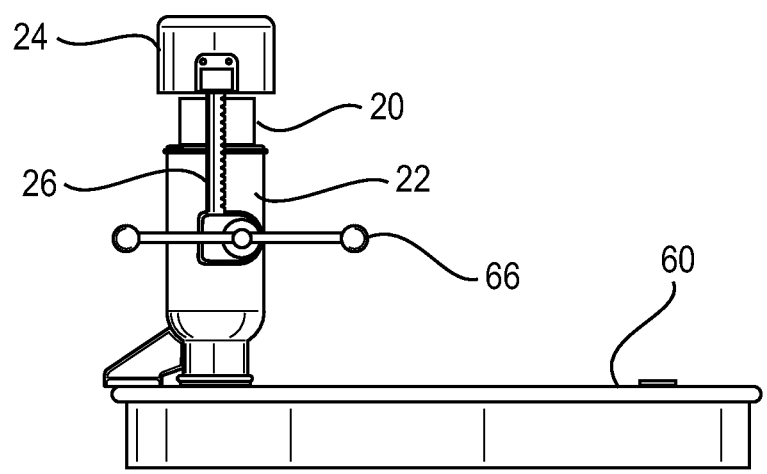
FIG. 11b is a perspective view showing an alternate embodiment device of this invention.

FIGS. 11a and 11b disclose alternate embodiments of this invention in which, respectively, a handle 64 or a pin 66, is used to raise and lower the rack, gear 26 in place of the activation wheel 28 shown in FIGS. 1-10. Otherwise the embodiment of FIGS. 11a and 11b operate substantially the same as does the embodiment of FIGS. 1-10.

The device can further include an indicator to relay that the pressurized container 20 is empty or substantially empty. The cap 24 of the device can include a small hole, preferably about ⅛ of an inch in diameter, to which a hollow tube is connected. The end of the hollow tube not in connection with the small hole is closed. A small item, such as a small, lightweight ball, is located within the tube. During the evacuation process, propellant pressure forces the small item to the end of the hollow tube, thus indicating to the operator that the evacuation process is ongoing. Once it is safe to remove the pressurized container 20, propellant pressure declines and the small item falls within the hollow tube. The operator then knows it is safe to remove the pressurized container 20.

It can be appreciated by those of ordinary skill in the art that the device for puncturing a pressurized container 20 of this invention does not require a power source and can be located indoors or outdoors with no consideration for access to electricity or other power sources.

Also, the device of this invention can be directly attached to existing off-the-shelf collection containers or receptacles for collection of residual contents. That is, since the threaded terminus of the elongated housing member 22 is sized to engage bung threads of typical storage drums, the invention can be easily transported without consideration for transporting large containers and can be inexpensively manufactured. It should be understood that although the device has been described herein to be mounted on drums standard in the United States, it could be sized to drum standards in any country.

Yet another benefit of this invention is that it accommodates most sizes of pressurized containers 20, such as aerosol cans. Regardless of can diameters or lengths, the internal support shoulder of the elongated housing member 22 is positioned and sized such that each inverted dome of an aerosol can is punctured at exactly the same spot as those of other cans. Conversely, this invention cannot be used to puncture a pressurized container 20, generally an aerosol can, with its nozzle-end, or dome-end, up. This is a safety feature, because the flat bottom of a container does not maximize evacuation of liquid residuals as does the funnel-shaped dome-end.

It is particularly beneficial, however, that, although the aerosol can is punctured at its downwardly-facing nozzle-end, the puncturing action cannot take place unless the cap 24 is in place. This prevents the aerosol can from accidentally loving upwards to injure an operator.

This invention is portable, lightweight and inexpensive, all features which facilitate compliance with regulations within a manufacturing plant. That is, the invention can be located at each "work center" at the convenience of workers, rather than in one centralized location which is where a large expensive machine would typically be located. That is, if a facility employs expensive machines, it is not economical to have many such machines spread out through the facility. However, manufacturing facilities have, in addition to their normal production line, maintenance shops where many aerosol cans are used, such as pump shops, machine shops, electrical shops, HVAC shops, maintenance shops etc.

Not only does this invention allow pressurized cans to be brought to "atmospheric pressure" prior to disposal, it also increases opportunities for recycling the cans. That is, aerosol cans which often contain chemicals will not be accepted by recyclers unless relieved of pressure. The 3 billion aerosol cans annually used in the US today amount to 375,000 tons of steel.

The lever operation of the device of this invention allows workers to easily puncture cans without endangering themselves, since compressed fluids are maintained in sealed portions of the elongated housing member 22, and workers are not in direct contact with the cans when they are punctured.

This invention facilitates the filtering of gases released from aerosol cans since filters can be relatively easily mounted to vent bung ports of standard drums.

Further, the device of this invention can be easily disassembled for required maintenance such as replacing pins or seals.

The auxiliary support member 57 of this invention improves its operation by dissipating downwardly applied forces to a rim of the receptacle, which is usually the strongest part of the receptacle. Thus, the auxiliary support member 57 protects an area around a bung opening of a drum.

Further, the auxiliary support member 57 facilitates the electrical grounding of a drum, which is required by some governmental agencies, to prevent build-up of static electricity. By providing a grounding screw 56 on the auxiliary support member 57, such grounding can be easily accomplished.

Obviously, many modifications may be made without departing from the basic spirit of the present invention. Accordingly, it will be appreciated by those skilled in the art that within the scope of the appended claims, the invention may be practiced other than has been specifically described herein. Many improvements, modifications, and additions will be apparent to the skilled artisan without departing from the spirit and scope of the present invention as described herein and defined in the following claims.

What is claimed is:

1. A device for puncturing a pressurized container for relieving the pressure therein and for releasing the residual contents thereof into a drum of a type having an end wall with a surrounding protruding peripheral rim, said device comprising:

a generally elongated housing member defining an elongated cavity with inner and outer surfaces and with openings at first and second ends thereof for receiving a pressurized container at said first end and further including a mounting structure for securing said second end of said elongated housing member to said end wall of said drum for collection by said drum of contents expelled from said pressurized container through said second end;

a puncturing member mounted within said elongated housing member generally parallel to said inner and outer surfaces of said elongated housing member, between said first and second ends and disposed a distance from said inner surface of said elongated housing member for piercing said pressurized container in said elongated cavity whereby gases and residual contents thereof are emptied into said drum through said opening at said second end;

a force-applying member operatively connected to said elongated housing member for engaging said pressurized container positioned in said elongated cavity and forcing said pressurized container towards said second end of said elongated housing member and onto said puncturing member, said force-applying member including a cap, a rack gear operatively connected to said cap, a paw gear operatively connected to said rack gear such that rotation of said paw gear causes vertical movement of said rack gear, and a manually manipulatable member operatively connected to said paw gear such that rotation of said manually manipulatable member causes rotation of said paw gear and wherein rotation of said activation wheel results in vertical movement of said cap, and downward movement of said cap causes said cap to engage said pressurized container positioned in said elongated cavity and to force said pressurized container towards said second end of said elongated housing member and onto said puncturing member, said cap being rotatable between a load position at which said cap is not over said elongated housing member and an engagement position at which said cap is over said elongated housing member;

a locking member to fix said cap over said elongated housing member; and said device further including an auxiliary support extending from said elongated housing member to operatively engage said protruding peripheral rim of said drum to stabilize said elongated housing member relative to said drum during operation of said device.

2. A device as in claim 1 wherein said attachment structure is a threaded terminus of said elongated housing member for engaging threads of said end wall of said drum.

3. A device as in claim 1 wherein said auxiliary support includes a locking member to prevent the device from being removed from said drum.

4. A device as in claim 1 wherein said puncturing member comprises a hollow puncturing pin extending upward towards said first end of said elongated housing member, said pin including a spring for biasing said pressurized container towards said first end of said elongated housing member.

5. A device as in claim 4 wherein said gases and residual contents are emptied into said drum through said hollow puncturing pin.

6. A device as in claim 1 wherein said elongated housing member further comprises a shelf member extending from said inner surface of said elongated housing member which shelf member includes an opening through which said puncturing member extends toward said first end of said elongated housing member.

7. A device as in claim 1 further comprising an alignment member mounted within said elongated cavity intermediate said first and second ends and through which said puncturing member extends such that said pressurized container is retained in an orientation which is generally parallel to a lengthwise center line of said elongated cavity.

8. A device as in claim 1 further comprising a counter means cooperatively engaged with said puncturing means wherein said counter means records each piercing of said pressurized container.

9. A device as in claim 8 wherein said counter means may be reset to its initial counter setting.

10. A device as in claim 8 wherein said counter means is enclosed within a housing such that a portion of said counter means remains visible.

11. A device as in claim 1, wherein said cap is rotatable about a pin between a position directly over said elongated housing member and a position which is not over said elongated housing member.

12. A device as in claim 11, wherein said cap further comprises a height adjustment member.

13. A device as in claim 12 wherein said height adjustment member further comprises a recessed magnetic member.

14. A device as in claim 4 wherein a pointed tip of said hollow puncturing pin is of a non-sparking metal.

15. A device as in claim 1 wherein said elongated housing member, said force-applying member and said device further including an auxiliary support means are of aluminum.

16. A device as in claim 1 wherein said elongated housing member, said force-applying member and said device further including an auxiliary support means are coated with a non-stick coating.

17. A device as in claim 1 wherein said rack gear, said paw gear, and said activation wheel are of aluminum.

18. A device as in claim 1 wherein said rack gear, said paw gear, and said activation wheel are coated with a non-stick coating.

19. A device for puncturing a pressurized container for relieving the pressure therein and for releasing the residual contents thereof into a drum of a type having an end wall with a surrounding protruding peripheral rim, said device comprising:
- a generally elongated housing member defining an elongated cavity having a central axis and including inner and outer surfaces and with openings at first and second ends thereof for receiving a pressurized container at said first end and further including a mounting structure for securing said second end of said elongated housing member to said end wall of said drum for collection by said drum of contents expelled from said pressurized container through said second end;
- a puncturing member mounted within said elongated housing member generally parallel to said inner and outer surfaces of said elongated housing member, between said first and second ends and disposed a distance from said inner surface of said elongated housing member for piercing said pressurized container in said elongated cavity whereby gases and residual contents thereof are emptied into said drum through said opening at said second end;
- a force-applying member operatively connected to said elongated housing member and including an engagement surface for engaging said pressurized container positioned in said elongated cavity and forcing said pressurized container towards said second end of said elongated housing member and onto said puncturing member, said force-applying member being movable along a first path and a second path, said first path extending between a load position at which said force-applying member is spaced from the axis of the elongated cavity and an engagement position at which the force-applying member is aligned with the axis, and said second path being aligned with the axis of the elongated body and extending between a first position at which said engagement surface is spaced a first distance from said puncturing member and a second position at which said engagement surface is a second distance from said puncturing member, said second distance being less than said first distance;
- a locking member to fix said force-applying member for movement along said second path; and
- said device further including an auxiliary support extending from said elongated housing member to operatively engage said protruding peripheral rim of said drum to stabilize said elongated housing member relative to said drum during operation of said device.

20. A device as in claim 19 wherein said puncturing member is offset from the central axis.

* * * * *